Feb. 2, 1965 W. W. THOMAS 3,168,010
SEQUENCE VALVES
Filed Jan. 9, 1963 3 Sheets-Sheet 3

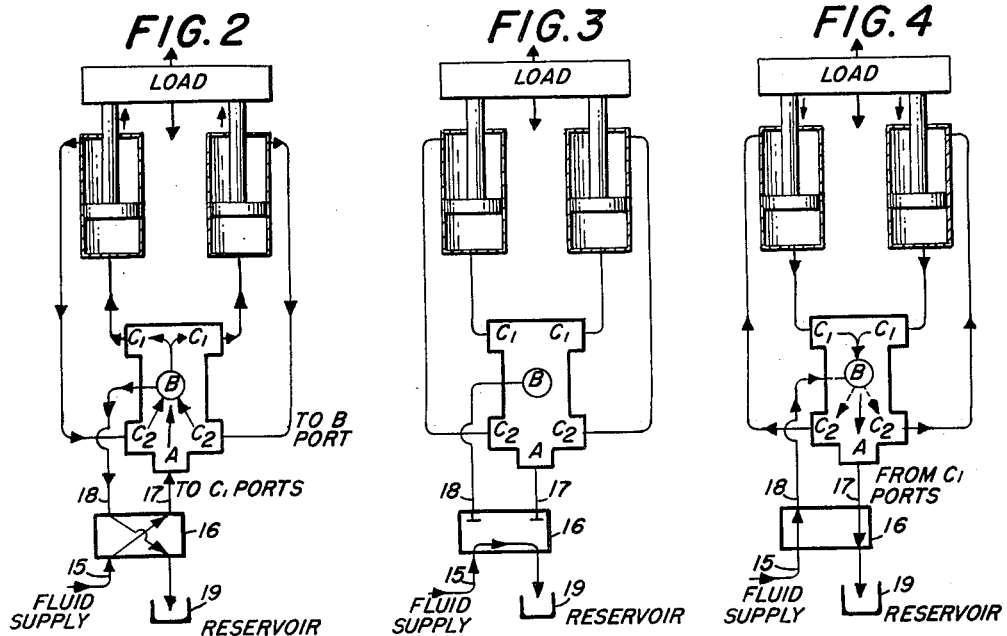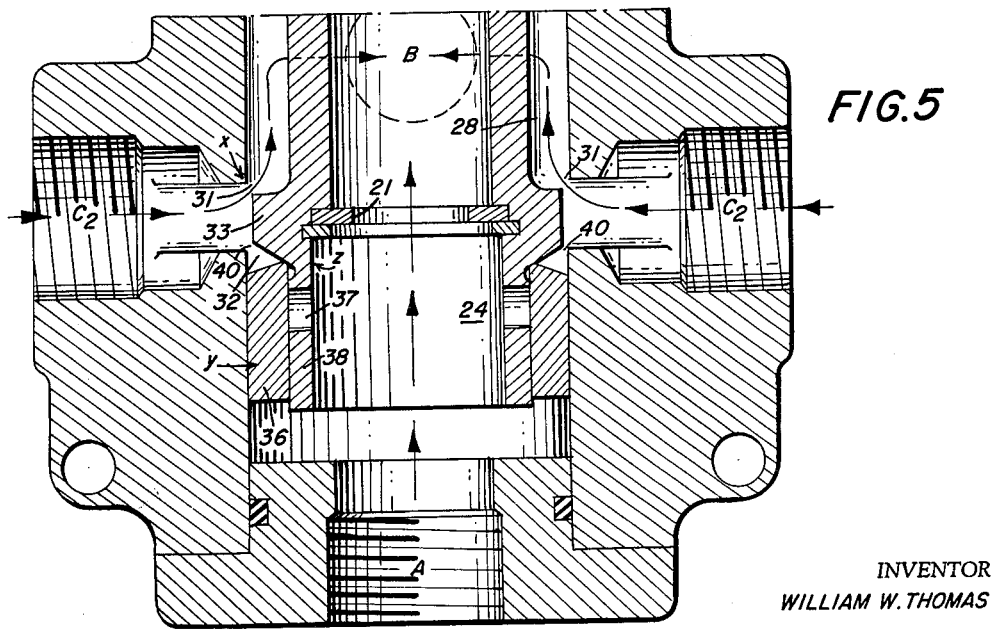

INVENTOR
WILLIAM W. THOMAS
BY Roland C. Rehm
ATTORNEY

United States Patent Office 3,168,010
Patented Feb. 2, 1965

3,168,010
SEQUENCE VALVES
William W. Thomas, Glenview, Ill., assignor to Waterman Hydraulics Corporation, Evanston, Ill., a corporation of Illinois
Filed Jan. 9, 1963, Ser. No. 250,381
8 Claims. (Cl. 91—420)

This invention relates to sequence valves for automatically increasing fluid supply to a cylinder and piston or other hydraulic motor (without requiring additional pump capacity for this purpose), in the event it be desired to increase the speed of movement of the piston or other mechanism necessitating an increased supply of fluid.

The invention may be readily understood by reference to one illustrative valve embodying the invention and shown in the accompanying drawings.

In said drawings:

FIG. 2 is a diagram of the system in which the valve is operating in the working or extension portion of the cycle and during normal speed of operation of the hydraulic motor;

FIG. 3 is a similar diagram of the system in neutral position wherein the motor is locked against movement;

FIG. 4 is a similar view in which the valve is operating in the reverse or retracting portion of the cycle;

FIG. 5 is a fragmentary section of the valve in the position assumed in the active or working portion of the cycle as the valve has partially shifted to the position it assumes for increasing the rate of delivery of fluid to the motor;

Figure 1:
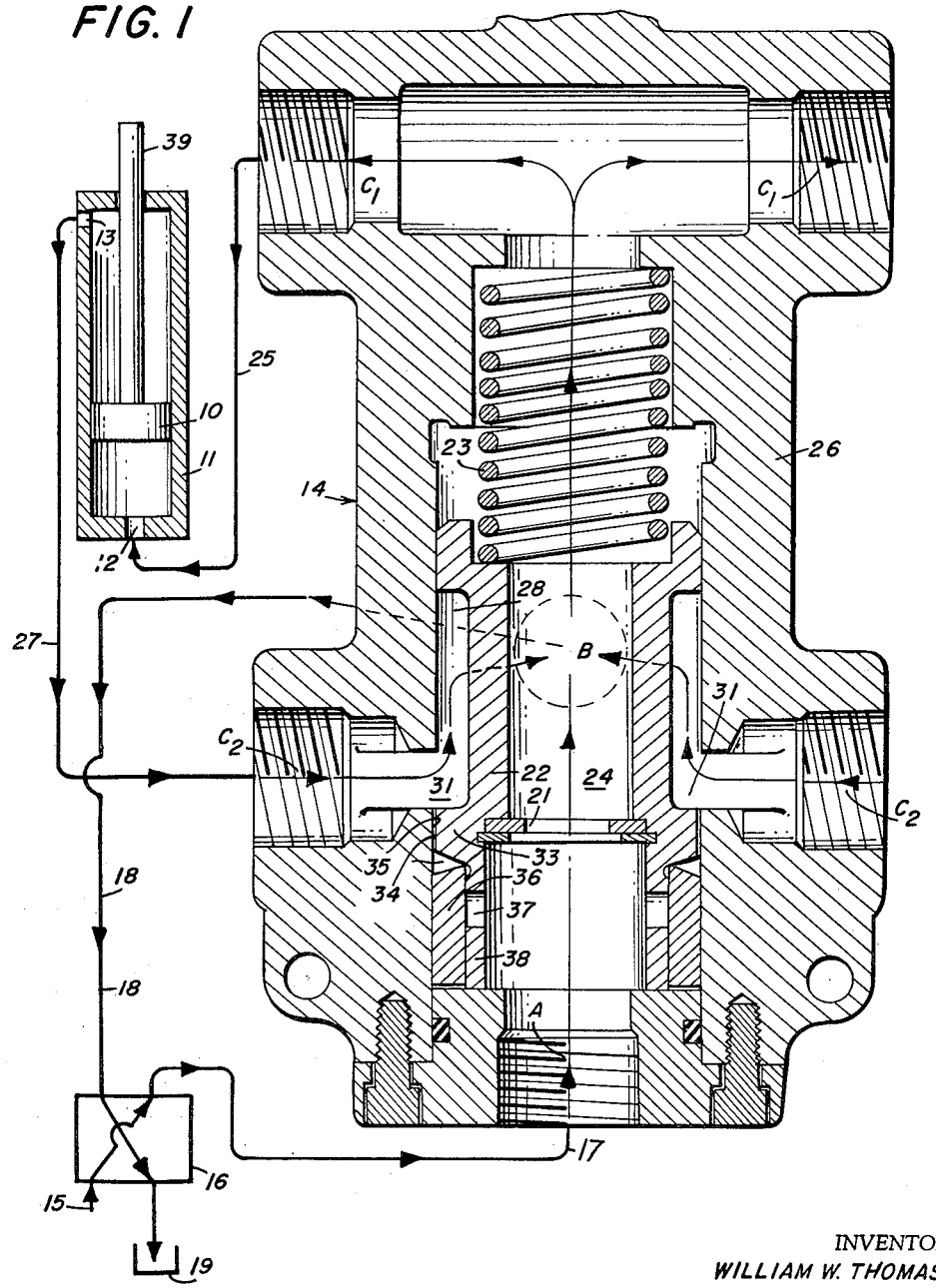
FIG. 1 is a longitudinal or axial section of the illustrative valve, and including a diagram of one illustrative system and hydraulic motor served by the system.

The hydraulic motor above referred to is here represented by a double acting piston 10 and cylinder 11 in which the extension or significant stroke comprises piston movement from the head or blind end of the cylinder toward the rod end. On such extension stroke, hydraulic fluid enters port 12 and the fluid in the rod end of the cylinder is displaced through port 13.

The invention is not necessarily limited to motor represented by a double acting piston and cylinder, but includes any other hydraulic motor in which increased flow might be advantageous during a part of the active cycle of operations of the motor.

For many uses it is desired to increase the speed of travel during a portion of the extension stroke, particularly during light or less than maximum loads, without however necessitating the use of a pump with additional capacity. This is accomplished in this instance by supplementing the normal pump flow into port 12 with the fluid displaced from the rod end of the cylinder through port 13. This is accomplished by the use of the illustrative control valve 14 next described.

Pressure fluid enters the valve through line 17 to port A from line 15 and a pump or other pressure source (not shown). A control valve 16 in the form of a 4-way or other appropriate valve is interposed in line 15 between the pressure source and line 17 leading to the valve. Any appropriate form of 4-way valve may be used; but it should be understood that if flow from the pressure source is not variable such control valve may function also to throttle flow from the pressure source so as to vary the rate of flow through the valve to the motor. The 4-way valve functions under proper setting (1) to direct pressure fluid from the pressure source and line 15 to line 17 connected to port A of the valve and to return fluid from line 18 to the reservoir 19, as shown in FIGS. 1 and 2, and when opened fully to obtain the rapid movement above referred to, as will presently more fully appear; or (2) to close lines 17 and 18 and lock the motor against movement as illustrated in FIG. 3; or (3) to direct pressure fluid to line 18 and to connect line 17 to discharge in reservoir 19 for the return or retracting stroke of the piston, as illustrated in FIG. 4.

Considering now the extension or work stroke of the piston and referring to FIGS. 1 and 2, when pressure fluid enters port A of the valve, it passes through a metering orifice 21 whose size (considering the rate of flow) is restricted only sufficiently to develop a pressure drop at a predetermined rate of flow sufficient to move the valve 22 against the resistance of spring 23. Valve 22 is here shown in the form of a piston valve slidable in an axial cylindrical passage in the valve housing 26. Valve piston 22 has an axial or central passage 24 through which flow reaches port $C_1$ from which it travels through line 25 to the hydraulic motor.

In the present instance a pair of pistons and cylinders 10 and 11 are shown (see FIGS. 2, 3 and 4) for such uses as require a pair of motors acting together, in which event the valve housing 26 is provided with a pair of ports $C_1$ and a pair of return ports $C_2$. If only a single piston and cylinder or other motor be used, then one set of ports $C_1$ and $C_2$ may either be blocked or plugged or omitted from the valve housing.

Return flow from the motor enters port $C_2$ through line 27 leading from port 13 at the rod end of the cylinder. Normally, flow passes through the circular space 28 around the valve piston and leaves through port B in the valve housing 26 and travels through line 18 to the control valve 16 and thence to discharge or reservoir 19.

Increase in motor speed is automatically accomplished by increasing flow to port A to a predetermined value. The ensuing sequence of operation then takes place automatically and rapidly.

Figure 6:
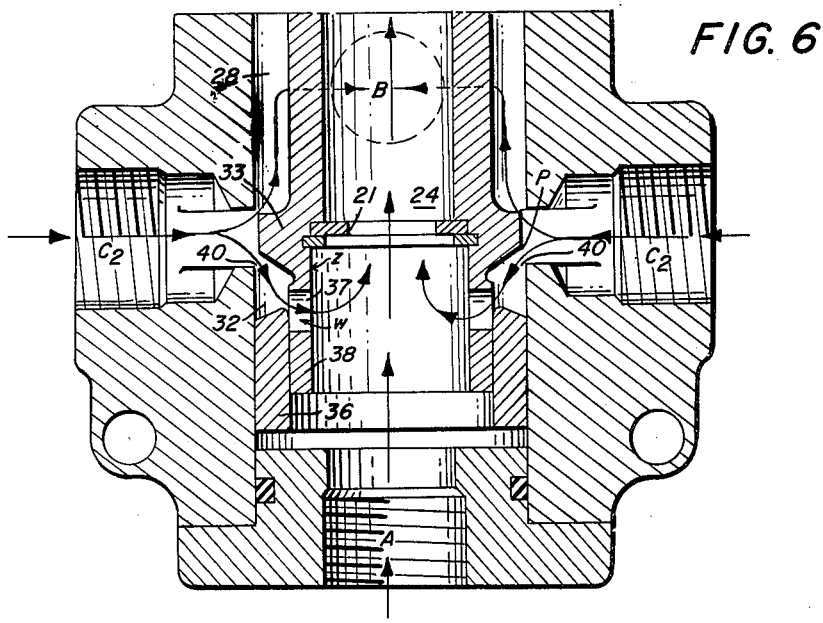
FIG. 6 is a similar section of the valve in an intermediate position of its travel in shifting to the increased flow position wherein speed of the motor has started to increase.

If and when the flow through the metering orifice 21 is increased to the point where the pressure drop at the metering orifice is sufficient to compress spring 23, the valve piston 22 then moves away from the position illustrated in FIG. 1 and starts to divert return flow at orifice 31, as illustrated in FIG. 6. As there shown the return flow to port B through space 28 is being reduced due to restriction, the balance passing at 40 into the annular space 32 around the valve piston which is exposed as the piston flange 33 clears the edge of orifice 31.

Figure 7:
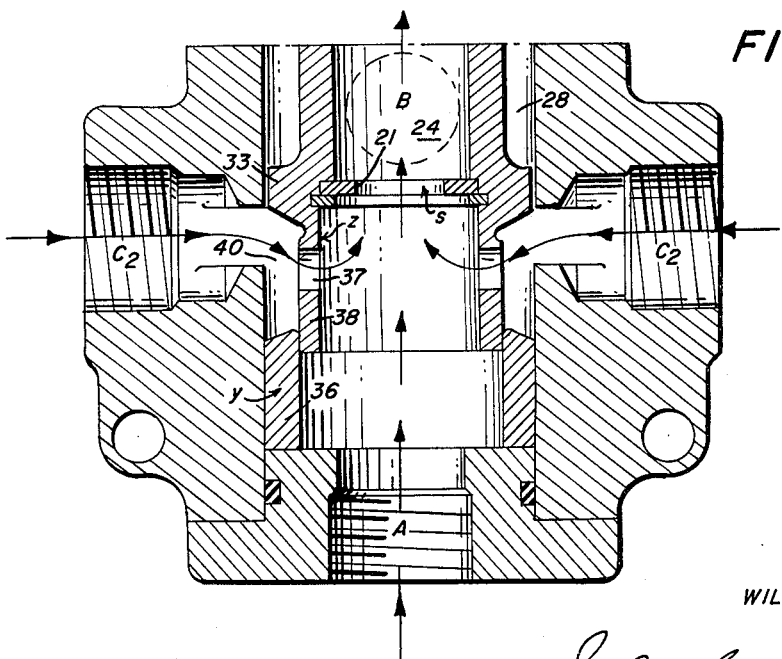
FIG. 7 is a similar section in which the valve has shifted fully to the position for delivering increased or supplemental flow to the motor.

Referring to FIG. 1, a slight clearance is provided at 34 between the cylinder wall 35 and the periphery of flange 33 to insure that the space 32 above the annular check valve 36 normally closing by-pass port 37 in the valve piston skirt 38 is maintained at substantially the low pressure in port $C_2$ and thereby to prevent pressure from building up in space 32 (due to leakage from passage 24) which would prevent the check valve from rising with the piston valve, as might be the case if the pressure below the check valve were equal to that above it. However, shortly after the piston valve and the check valve 36 start to move up together, the increased pressure caused by restriction of flow from port $C_2$ to port B, exists in space 32 and acts on the check valve to move it down away from the piston valve (see FIG. 6) and thereby to uncover port 37 in the piston valve, thus adding the return flow from port $C_2$ to the main flow in the space 24 traveling to port $C_1$ and the head end of cylinder 11. Finally, as shown in FIG. 7, port 37 is fully uncovered and flange 33 of the piston valve cuts off return flow to port B altogether, and normal flow in the head end of the piston is augmented by all return flow from the rod end of the cylinder. This substantially increases the speed of travel of the piston.

Normal speed of motor operation occurs when flow rates are below the predetermined value at which, of course, the motor can operate under substantially heavier loads.

It should be understood that since the area of the rod side of the piston is less (by the cross section of the rod 39) than the area of the opposite or blind side of the piston, the fluid pressure in the rod end of the cylinder will be higher (when sufficiently restricted) than that in the head end, with the result that such pressure is sufficiently higher than that in the head end of the cylinder to insure the entrance of the diverted flow from the rod end into the head end of the cylinder against the pressure in the head end.

It should be understood also that the extent to which it is possible thus to increase the speed of travel of the piston depends on the ratio between the piston area and the cross section of rod 39. If, for example, the piston area be five times that of the rod section, it will be possible to increase the piston speed about five times its maximum normal speed. Of course, this will require proportional increase in the pressure to operate the motor.

As stated above, in actual operation the sequence of movements of the check valve 36 and the piston valve 22 itself above described occur rapidly once the forces acting on the valve are overbalanced, with the result that the piston valve rises very quickly and the check valve falls equally quickly to expose port 37. This is because the return flow entering port 37 is added to the port A flow already passing through orifice 21, which rapidly increases the overbalancing force on piston valve 22. Check valve 36 prevents flow entering port A from traveling to port $C_2$ during that portion of the cycle when the pressure at port A is higher. However, in any position of valve 22 when the pressure at port $C_2$ is higher than that at port A, the check valve 36 will move down or away from valve 22 and permit flow entering port $C_2$ to pass through port 38 and join the flow entering port A. In other words, the pressure of port $C_2$ will never be higher than that at port A except when an adequate passage exists at 40 from port $C_2$ into space 32 below flange 33.

On reverse flow, when piston 10 is retracting, as well as when no flow exists, both valve 22 and check valve 36 are in the static position illustrated in FIG. 1. Spring 23 holds these elements in this position when there is no flow; and return flow merely adds to the spring force.

There are numerous uses for a valve and system of this character. In general it makes possible much more rapid movement with a given pump output, than would be possible in a conventional system without increasing pump capacity.

Obviously the invention is not limited to the details of the illustrative valve, the specific motor illustrated, or the system in which they are employed, since these may be variously modified. Moreover it is not indispensable that all features be used conjointly since various features may be used to advantage in different combinations and subcombinations.

Having described my invention, I claim:

1. A sequence valve of the character described comprising in combination a valve body having an exit port for fluid adapted to be delivered to a hydraulic motor for energizing the advance portion of its cycle of operation, a return port in said body for flow from the motor in the said advanced portion of its cycle, a discharge port for said return flow, an inlet port for pressure fluid from a pressure source, a main passage through said valve body to conduct flow from said inlet port to said exit port, a control valve in said passage adapted to be acted on by the flow from inlet to exit ports, an orifice in said valve through which said flow passes to create a pressure drop in said flow as it passes said valve for moving said valve in response to the rate of flow, a spring resisting said valve movement, a return flow passage in said housing for conducting return flow entering said return port to said discharge port, said valve being constructed and arranged to control and cut off flow through said return flow passage as said valve is moved by flow through said orifice, said valve having a by-pass port opened to said return flow as said valve moves to cut off flow through said return passage, said by-pass port being connected to said main passage and thereby diverting said return flow to said main passage, whereby the return flow is diverted to said main passage to augment the flow through said exit port and to said motor.

2. A sequence valve of the character described comprising in combination a valve body having an exit port for fluid adapted to be delivered to a hydraulic motor for energizing the advance portion of its cycle of operation, a return port in said body for flow from the motor in the said advanced portion of its cycle, a discharge port for said return flow, an inlet port for pressure fluid from a pressure source, a main passage through said valve body to conduct flow from said inlet port to said exit port, a control valve in said passage adapted to be acted on by the flow from inlet to exit ports, an orifice in said valve through which said flow passes to create a pressure drop in said flow as it passes said valve for moving said valve in response to the rate of flow, a spring resisting said valve movement, a return flow passage in said housing for conducting return flow entering said return port to said discharge port, said valve being constructed and arranged to control and cut off flow through said return flow passage as said valve is moved by flow through said orifice, said valve having a by-pass port opened to said return flow as said valve moves to cut off flow through said return passage, said by-pass port being connected to said main passage and thereby diverting said return flow to said main passage, whereby the return flow is diverted to said main passage to augment the flow through said exit port and to said motor, said control valve being provided with a check valve to control said by-pass port and being exposed to the pressure at said inlet port to hold said check valve closed, said check valve being also exposed to said diverted return flow and movable thereby to open said bypass port when said pressure of said diverted flow exceeds the inlet pressure on said check valve.

3. A sequence valve of the character described comprising in combination a valve body having an exit port for fluid adapted to be delivered to a hydraulic motor for energizing the advance portion of its cycle of operation, a return port in said body for flow from the motor in the said advanced portion of its cycle, a discharge port for said return flow, an inlet port for pressure fluid from a pressure source, a main passage through said valve body to conduct flow from said inlet port to said exit port, a control valve in said passage adapted to be acted on by the flow from inlet to exit ports, an orifice in said valve through which said flow passes to create a pressure drop in said flow as it passes said valve for moving said valve in response to the rate of flow, a spring resisting said valve movement, a return flow passage in said housing for conducting return flow entering said return port to said discharge port, said valve being constructed and arranged to control and cut off flow through said return flow passage as said valve is moved by flow through said orifice, said valve having a by-pass port opened to said return flow as said valve moves to cut off flow through said return passage, said by-pass port being connected to said main passage and thereby diverting said return flow to said main passage, whereby the return flow is diverted to said main passage to augment the flow through said exit port and to said motor, said control valve being provided with a check valve to control said by-pass port and being exposed to the pressure at said inlet port to hold said check valve closed, said check valve being also exposed to said diverted return flow and movable thereby to open said by-pass port when said pressure of said diverted flow exceeds the inlet pressure on said check valve, said main passage being cylindrical and said control valve being slidable therein and having an axial passage for said inlet flow, the said orifice being in said axial passage so that said inlet flow passes through said orifice and tends to move said valve in the direction of flow against the resistance of said spring, said control valve being provided with a surface at said return port movable with the said control valve to close and cut off flow to said return flow passage and direct the same to said check valve and said by-pass port.

4. A sequence valve of the character described comprising in combination a valve body having a cylindrical passage therein, a control valve slidable in said passage and having an axial fluid passage therein, said body having an inlet port and an exit port open to said axial passage for flow entering said inlet and leaving by said exit port, said body also having a return flow port and a discharge port and a return flow passage connecting said return and discharge ports, said control valve having an orifice in said axial passage through which flow therein passes, said orifice being restricted to cause a pressure drop for moving said control valve in the direction of flow, a spring resisting movement of said valve in the direction of flow, said control valve having a by-pass port therein adapted when the valve is moved sufficiently to connect with said return flow port to direct return flow to flow in said axial passage, said control valve being constructed and arranged to control said return flow and when moved as aforesaid to cut off flow to said return flow passage and direct the same to said by-pass port, said control valve being provided with a check valve controlling said by-pass port and being exposed to the pressure at said inlet port to hold said check valve closed and being exposed to pressure at said return port when said control valve is shifted, said check valve being adapted to move to open said by-pass port when the pressure at said return port over-balances the opposing pressure at said inlet port.

5. In a hydraulic system including a hydraulic motor having inlet and return lines for conducting hydraulic fluid for operating said motor and returning the flow displaced therefrom, the combination comprising a sequence valve having a valve body provided with exit and return ports connected respectively with said inlet and return lines, said valve body also having an inlet port and an axial passage connecting said inlet and exit ports for flow entering the inlet port and leaving by said exit port, a regulating valve for controlling flow of pressure fluid to said inlet port, said body also having a discharge port and a return flow passage connecting said return and discharge ports, whereby said return flow is adapted to flow to said hydraulic motor and increase the speed thereof.

6. In a hydraulic system including a double-acting work piston and cylinder having inlet and return lines for conducting hydraulic fluid for operating said piston and for returning fluid displaced therefrom, the combination comprising a sequence valve having a valve body provided with exit and return ports adapted to be connected respectively with said inlet and return lines, said valve body also having an inlet port and an axial passage connecting said inlet and exit ports for flow entering said inlet port and leaving by said exit port, a regulating valve for controlling flow of pressure fluid to said inlet port, said body also having a discharge port and a return flow passage connecting said return and discharge ports, whereby return flow is added to the flow entering said inlet port thereby to increase the speed of travel of said piston.

7. In a hydraulic system including a double-acting work piston and cylinder having inlet and return lines for conducting hydraulic fluid for operating said piston and for returning fluid displaced therefrom, the combination comprising a sequence valve having a valve body provided with exit and return ports adapted to be connected respectively with said inlet and return lines, said sequence valve body having passages for conducting return flow entering said inlet port to said exit port, and a check valve in said body responsive to pressure at said inlet port and said return port for connecting said return flow with said exit port thereby to augment flow from said exit port to the work piston to increase the speed thereof.

8. A sequence valve of the character described comprising in combination a valve body having an exit port for fluid adapted to be delivered to a hydraulic motor for energizing the advance portion of its cycle of operation, a return port in said body for flow from the motor in the said advanced portion of its cycle, a discharge port for said return flow, an inlet port for pressure fluid from a pressure source, a main passage through said valve body to conduct flow from said inlet port to said exit port, a control valve in said passage adapted to be acted on by the flow from inlet to exit ports, an orifice in said valve through which said flow passes to create a pressure drop in said flow as it passes said valve for moving said valve in response to the rate of flow, a spring resisting said valve movement, a return flow passage in said housing for conducting return flow entering said return port to said discharge port, said valve being constructed and arranged to control and cut off flow through said return flow passage as said valve is moved by flow through said orifice, said valve having a by-pass port opened to said return flow as said valve moves to cut off flow through said return passage, said by-pass port being connected to said main passage and thereby diverting said return flow to said main passage, whereby the return flow is diverted to said main passage to augment the flow through said exit port to said motor, said control valve being provided with a check valve to close said by-pass port and movable by the pressure of said diverted flow to open said by-pass port.

References Cited by the Examiner
UNITED STATES PATENTS

| | | | |
|---|---|---|---|
| 429,664 | 6/90 | Thorpe | 91—416 |
| 2,729,224 | 1/56 | Stueland | 91—436 X |
| 2,976,878 | 3/61 | Smilges | 91—436 X |

FRED E. ENGELTHALER, *Primary Examiner.*
SAMUEL LEVINE, *Examiner.*